United States Patent [19]

Darrow

[11] 3,760,192

[45] Sept. 18, 1973

[54] FAIL-SAFE LEVEL DETECTOR

[75] Inventor: John O. G. Darrow, Murrysville, Pa.

[73] Assignee: Westinghouse Electric Corporation, Pittsburgh, Pa.

[22] Filed: Feb. 18, 1972

[21] Appl. No.: 227,585

[52] U.S. Cl............... 307/235 R, 307/256, 307/318

[51] Int. Cl.......................... H03k 17/74, H03k 5/20

[58] Field of Search..................... 307/235, 256, 318

[56] References Cited

UNITED STATES PATENTS 3,213,294 10/1965 Okuda ........................... 307/318 X

*Primary Examiner*—John Zazworsky

*Attorney*—F. H. Henson et al.

[57] ABSTRACT

A periodic or carrier signal is provided to the anode electrode of a zener diode through a transformer. A signal means provides a direct current level to the cathode electrode of the zener diode. Whenever the direct current level provided by the signal means is at least at a predetermined signal level the zener diode conducts and provides a low impedance path for the periodic signal to the input of an amplifier. The amplifier amplifies the periodic signal and provides the latter signal to the input of a signal utilization device. Whenever the direct current level provided by the signal means is at a signal level less than the predetermined signal level the zener diode is held non-conductive and the signal path to the input of the amplifier is blocked, whereby an amplified signal is not provided to the input of the signal utilization means.

7 Claims, 2 Drawing Figures

FAIL-SAFE LEVEL DETECTOR

BACKGROUND OF THE INVENTION

Fail-safe level detectors are useful in many automatic control systems, for example, a vehicle control system wherein it is of primary importance to accurately detect a voltage signal level such as a voltage signal which is indicative of the speed at which the vehicle is moving. If for example, a given voltage level is indicative of a vehicle traveling at a desired speed and a second voltage level, which is lower than the first voltage level, is indicative of the vehicle traveling at a speed greater than the desired speed it is of importance that the latter signal levels be accurately detected such that the vehicle may subsequently be braked in the event the signal level is not correct.

Zener diodes have been used in prior art level detectors for accurately checking an applied signal voltage level. For example, in a known level detector the impedance of a zener diode has been used to provide degenerative feedback for an amplifier such that when the level applied to the zener diode is correct there is no degenerative feedback supplied to the amplifier and a periodic signal applied to the amplifier is amplified; and when, on the other hand, the voltage level to be checked is incorrect the zener diode is cutoff and degenerative feedback is applied to the amplifier causing the amplifier not to provide an output signal. Another known level detector uses a zener diode to provide operating potential to an oscillator whenever the level is correct and to interrupt the application of the operating potential to an oscillator whenever the voltage level is incorrect.

According to the teachings of the present invention a novel fail-safe level detector is disclosed in which a zener diode is used on the one hand as a signal path for an applied periodic signal to the input of an amplifier whenever the signal level is correct and, on the other hand, the zener diode is used to block the signal path of a periodic signal to the input of the amplifier whenever the signal level is incorrect.

SUMMARY OF THE INVENTION

According to the teachings of the present invention a level detector is disclosed which includes an amplifier having an input to which a signal to be amplified may be applied and an output at which the amplified signal is manifested. Also included are means responsive to a provided first signal for one of permitting a provided second signal to be applied to the input of the amplifier in the event the first signal is at a selected level, and for blocking the application of the second signal to the input of the amplifier in the event the level of the first signal is less than the selected signal level.

DESCRIPTION OF THE PREFERRED EMBODIMENT

Figure 1:
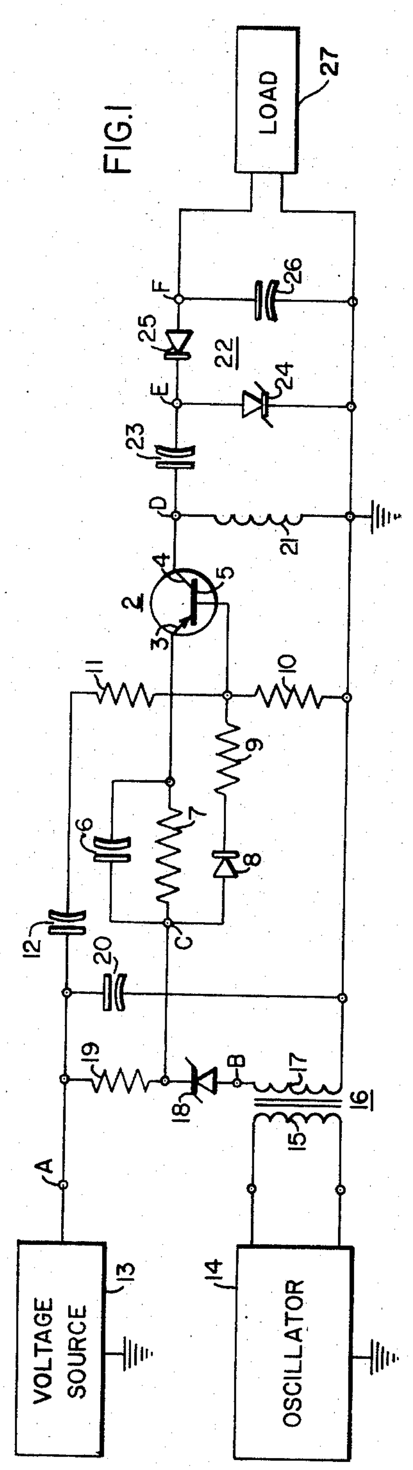
FIG. 1 is a schematic and block diagram representation of a fail-safe level detector embodying the teachings of the present invention.

FIG. 1 is a schematic diagram of the level detector embodying the teachings of the present invention. An amplifier such as the transistor 2 has an input emitter electrode 3, an output collector electrode 4, and a base electrode 5. A capacitor 6 and resistor 7 are connected in parallel and provide emitter bias for the transistor amplifier 2. A diode 8, resistor 9, and resistor 10 provide base bias for the transistor amplifier 2. A resistor 11 functions as a parasitic suppressor for the amplifier, and the capacitor 12 provides a ground path for the grounded base transistor 2. The path to ground is through a voltage source 13 which provides the direct current (DC) voltage level which is to be checked for a proper amplitude or magnitude by the level detector. The signal to be amplified by the transistor 2 is provided by an oscillator 14 to the primary winding 15 of a transformer 16. The secondary winding 17 of the transformer has one terminal connected to circuit ground and the other terminal connected to the anode electrode of a voltage responsive device such as a zener diode 18. The zener diode 18 functions as a signal path for the signal from the oscillator 14 to the input or emitter electrode of the amplifier 2. This will be explained shortly. It is to be appreciated that the zener diode is a voltage responsive device of the type which becomes conductive and exhibits a relatively low impedance in response to a signal of a predetermined level being provided to its cathode electrode and which exhibits a relatively high impedance and becomes nonconductive when a signal at a level lower than the predetermined level is provided to the cathode electrode of the zener diode. Other such devices for example, neon glow tubes or gas type tubes may also be used in the practice of the invention. The cathode electrode of the zener diode 18 is connected to the voltage source 13 through a resistor 19 which must have a resistance value low enough to provide a good DC path to the zener diode 18 but must also have a high enough resistance such that there is not excessive loading of the transformer 16. A capacitor 20 is connected from the output of the voltage source 13 to circuit ground and the function of the latter capacitor is to ensure that the DC signal source 13 is of low enough impedance in the frequency band of interest, that is frequencies near the frequency of the signal provided at the output of the oscillator 14.

The output collector electrode 4 of the transistor 2 is connected to an impedance means such as the inductor 21. A resistor may be used as the output load if a lower magnitude output signal is acceptable. The inductor 21 may be connected to any suitable load device for utilization of the output periodic signal, and for purposes of illustration only it is shown as connected to a halfwave voltage doubler 22 which is comprised of a capacitor 23, a zener diode 24, a conventional diode 25 and a capacitor 26. The capacitor 26 is shown connected in parallel with a suitable signal utilization or load device 27. The device 27 in practice may be a logic gate or any other device which is responsive to an input DC signal level which is developed across the capacitor 26. The device 27 provides a finite impedance to the transistor amplifier 2 whereby a finite gain is provided by the amplifier 2.

The zener diode 18 functions to provide a signal path for the provided periodic input signal from the oscillator 14 to the input electrode 3 of the transistor 2 for amplification in the event the voltage source 13 is providing a DC signal at a predetermined level to the cathode electrode of the zener diode 18 causing the latter diode to break down. The latter signal path is from the secondary winding 17 of the transformer 16, through the zener diode 18 and to the input electrode 3 of the transistor 2 by way of the emitter biasing network comprised of the capacitor 6 and the resistor 7. In the event the signal provided by the voltage source 13 is at a level or magnitude below the predetermined zener break down voltage the zener diode 18 becomes non-conductive and exhibits a relatively high impedance such that the signal path from the secondary winding 17 to the input emitter electrode 3 is blocked.

Figure 2:
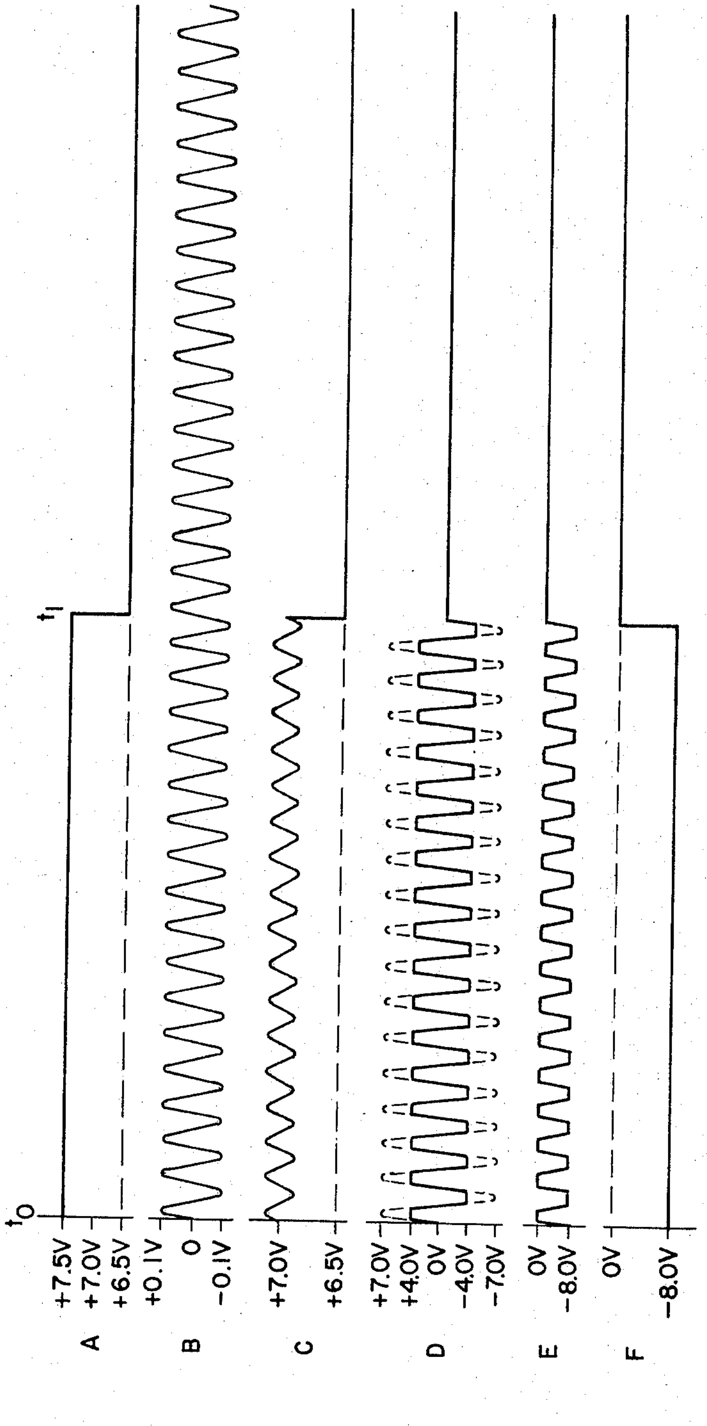
FIG 2 is a wave shape relationship diagram helpful in the understanding of the circuit of FIG. 1.

Consider now the detailed operation of the subject level detector. The letters A-F found in the circuit of FIG. 1 are the circuit points at which the waveshapes A–F respectively illustrated in FIG. 2 are manifested in the circuit of FIG. 1. It is to be assumed that the zener diode 18 has a zener break down voltage on the order of +7 volts. That is, when a signal of +7 volts or greater in a magnitude in a positive sense is applied to the cathode electrode of the zener diode 18, the zener diode breaks down and provides a low impedance path to the input electrode 3 of transistor 2. Whenever the magnitude of the signal from the voltage source 13 is at a magnitude less than +7 volts the zener diode 18 is held non-conductive and exhibits a relatively high impedance, blocking the signal path to the input electrode 3 of the transistor 2. At a time to the DC signal provided at the output of the voltage source 13 is at a level of +7.5 volts (see wave shape A of FIG. 2). This signal is coupled by way of the resistor 19 to the cathode electrode of the zener diode 18, and in response thereto the zener diode breaks down and provides a low impedance signal path. At this time the oscillator 14 is providing, for example, a 100 kilohertz (KHZ) square wave to the primary winding 15 of the transistor 16. The primary winding is made self-resonant at a low enough frequency to safely prevent passage of any high frequency oscillations or noise. Therefore, the secondary voltage is rounded off and, for example, is at a signal level at 0.2 volts peak to peak (see wave shape B of FIG. 1). This latter periodic signal is therefore riding at approximately a +7 volt level as seen at the input to the emitter biasing network for the transistor 2 (see wave shape C of FIG. 2). In response to the latter input signal the transistor 2 becomes conductive and a periodic output signal is produced across the output collector electrode 4 which traverses from +4.0 to −4.0 volts (see wave shape D of FIG. 2). The latter signal would traverse from +7.0v to −7.0v if the zener diode 24 were not in the circuit as illustrated by the phantom portions of wave shape D. This signal is passed by the capacitor 23 and the zener diode 24 breaks down at approximately 8 volts and the clipped wave form illustrated at wave shape E of FIG. 2, which traverses between 0 and −8 volts is produced as illustrated by waveshape E of FIG. 2. The diode 25 conducts in response to the negative going portions of the latter wave, and a direct current (DC) signal is produced across the capacitor 26 as illustrated by the wave shape F of FIG. 2. This negative voltage level which is approximately −8 volts is applied to the load device 27 for activating same.

At a time t1 the voltage source 13 provides an output DC signal on the order of +6.5 volts (see waveshape A of FIG. 2). Since this signal is at a magnitude which is less than the magnitude required to cause the zener diode to break down, the latter diode becomes non-conductive and the signal path for the periodic signal through the secondary windings 17 of the transformer 16 to the input electrode 3 is blocked and no periodic input signal is provided to the transistor 2 (see wave shape C of FIG. 2). Since the transistor 2 no longer has a periodic signal at its input, a zero volt signal is manifested at the output collector electrode 4 of the transistor 2 (see wave shape D of FIG. 2). In response thereto, the zener diode 24 is held non-conductive and a signal essentially at zero volts is manifested at the common connection between the capacitor 23, zener diode 24, and a diode 25 (see wave shape E of FIG. 2). It is seen therefore that zero volts is also manifested across the capacitor 26, which signal in turn is applied across the load device 27, which in normal practice disables the load device 27. The transistor amplifier 2 provides no periodic signal output, as illustrated, until the voltage source 13 once again applies a DC signal of a magnitude equal to or greater than +7 volts which is the breakdown voltage for the zener diode 18. When this latter condition once again occurs, the zener diode 18 breaks down and provides a low impedance path for the periodic signal produced across the secondary winding 17 of the transformer 16 and this signal is applied to the input electrode 3 of the transistor 2 and the system once again functions as was described for the time to.

It may be seen that the subject level detector is truly fail-safe in its design features. If the zener diode 18 shorts, the source 13 is connected to ground and no DC is available for the transistor 2. If the zener diode 18 opens, the signal path to the input 3 of transistor 2 is blocked. It is readily seen that any probable failure of the remaining circuit components also results in no periodic output signal being provided by the transistor 2.

In summary a fail-safe level detector has been described which is comprised of an amplifier having an input to which a signal to be amplified is applied and an output at which the amplified signal is manifested. A zener diode is responsive to a provided first signal, for example, a DC signal level for permitting a provided second signal, for example, a periodic signal to be applied to the input of the amplifier for amplification in the event the first signal is at a predetermined signal level, and the zener diode blocks the application of the second signal to the input of the amplifier in the event the level of the first signal is less than the predetermined signal level.

What is claimed is:

1. A level detector comprising in combination:

an amplifier having an input to which a signal to be amplified may be applied and an output at which the amplified signal is manifested;

a first signal means for providing a first signal which at given times may be at different signal levels;

a second signal means for providing a periodic signal;

a transformer having a primary winding connected to said second signal means and also having a secondary winding; and a zener diode having an anode electrode connected to a selected one of said first signal means and the secondary winding of said transformer, and a cathode electrode connected to the remaining one of said first signal means and the secondary winding of said transformer, with the electrode that is connected to said first signal means being also connected to the input of said amplifier, said zener diode becoming conductive and providing a signal path for the application of said periodic signal to the input of said amplifier for amplification whenever said first signal is at a selected signal level independent of the signal level of said periodic signal, with said zener diode becoming non-conductive and opening said signal path for blocking the application of said periodic signal to the input of said amplifier whenever said first signal is at a level less than said selected signal level independent of the signal level of said periodic signal.

2. The combination claimed in claim 1 wherein said amplifier comprises a transistor, with the emitter electrode forming one of the input and output for said amplifier, and the collector electrode forming the remaining one of the input and output for said amplifier, and the base electrode being connected by impedance means to ground.

3. The combination claimed in claim 2 including a detector connected to the output of said amplifier.

4. The combination claimed in claim 3 including a load of finite impedance being connected to said detector.

5. The combination claimed in claim 2 including a first biasing network connected between the electrode of said zener diode that is connected to said first signal means and the base electrode of said transistor.

6. The combination claimed in claim 5 including a second biasing network connected between the electrode of said zener diode that is connected to said first signal means and the one of the emitter and collector electrodes of said transistor which forms the input for said amplifier.

7. A level detector comprising in combination:

a first signal means for providing a first signal which at given times may be at different direct current levels;

a second signal means for providing a periodic signal;

a transformer having a primary winding connected to said second signal means and also having a secondary winding;

a zener diode having an anode electrode connected to a selected one of said first signal means and the secondary winding of said transformer, and having a cathode electrode connected to the remaining one of said first signal means and the secondary winding of said transformer;

a transistor having base, emitter, and collector electrodes;

a first resistor;

a first capacitor connected in parallel with said first resistor and being connected between the electrode of said zener diode that is connected to said first signal means and a selected one of the emitter and collector electrodes of said transistor;

a first diode having one electrode connected to the electrode of said zener diode that is connected to said first signal means;

a second resistor connected at one terminal to the remaining electrode of said first diode and connected at the remaining terminal to the base electrode of said transistor; and a load device connected to the remaining one of the emitter and collector electrodes of said transistor.

* * * * *